(12) United States Patent
Rouleau et al.

(10) Patent No.: US 8,562,940 B2
(45) Date of Patent: Oct. 22, 2013

(54) PROCESS FOR PREPARING AN ALUMINA WITH CONTROLLED MESOPOROSITY

(75) Inventors: Loic Rouleau, Charly (FR); Sébastien Royer, Montamise (FR); Christine Lancelot, Hellemes (FR); Franck Dumeignil, Fretin (FR); Edmond Payen, Jenlain (FR); Pascal Blanchard, Hulluch (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 0 days.

(21) Appl. No.: 12/978,774

(22) Filed: Dec. 27, 2010

(65) Prior Publication Data

US 2012/0237439 A1 Sep. 20, 2012

Related U.S. Application Data

(63) Continuation of application No. PCT/FR2009/000682, filed on Jun. 10, 2009.

(30) Foreign Application Priority Data

Jun. 27, 2008 (FR) .................................. 08 03691

(51) Int. Cl.
*C01F 7/00* (2006.01)
(52) U.S. Cl.
USPC ............ 423/625; 423/628; 423/630; 423/631
(58) Field of Classification Search
USPC .................................. 423/625, 628, 630, 631
See application file for complete search history.

(56) References Cited

U.S. PATENT DOCUMENTS

| 6,214,312 | B1 | 4/2001 | Kolenda et al. | |
|---|---|---|---|---|
| 7,399,459 | B2 | 7/2008 | Lee et al. | |
| 2005/0281734 | A1 | 12/2005 | Lee et al. | |
| 2009/0029847 | A1 * | 1/2009 | Euzen et al. | 502/71 |

FOREIGN PATENT DOCUMENTS

| EP | 0 974 555 A | 1/2000 |
|---|---|---|
| FR | 2 772 017 A | 6/1999 |
| WO | WO 2004/014799 | 2/2004 |

OTHER PUBLICATIONS

International Search Report of PCT/FR2009000682, Date of Completion May 10, 2010, Date of Mailing May 20, 2010.
Ray Jagadish C. ; You Kwang-Seok; Ahn Ji-Whan ; Ahn Wha-Seun "Mesoporous alumina (I): Comparison of synthesis schemes using anionic, cationic,a nd non-ionic surfactants", Microporuous and Mesoporous Materials, vol. 100, No. 1-3m 2007, pp. 183-190, XP002499038.
Saúl Cabrera, Jamal El Haskourim Jaime Alamo, Aurelio Beltran, Daniel Beltran, Sagrario Mendioroz, M. Dolores Marcos, Pedro Amorós "Surfactant-Assisted Synthesis of Mesoporous Alumina Showing Continously Adjustable Pore Sizes", Advanced Materials, vol. 11, No. 5, mars 1999 (Feb. 1999) pp. 379-381, XP002499039.
V. Gonzalez-Pena, I. Diaz, C. Marquez-Alvarez, E. Sastre and J Perez-Pariente: "Thermally stable mesoporous alumina synthesized with non-ionic surfactants in the presence of amines", Microporous and Mesoporous Materials, vol. 44-45, Apr. 6, 2001, pp. 203-210, XP002499040.
Qian Liu, Aiqin Wang, Tao Zhang: "Microphologically controlled synthesis of mesoporous alumina", Microporous and Mesoporous Materials, vol. 100, No. 1-3, Mar. 23, 2007, pp. 35-44, XP00249041.

* cited by examiner

*Primary Examiner* — Steven Bos
(74) *Attorney, Agent, or Firm* — Millen, White, Zelano & Branigan, P.C.

(57) ABSTRACT

A process for preparing a mesoporous alumina is described, comprising the following steps:
a) mixing, in aqueous solution, at least one source of aluminum constituted by an aluminum alkoxide, at least one cationic surfactant and at least one organic solvent selected from methanol and ethanol;
b) hydrothermally treating the mixture formed in said step a);
c) drying the solid formed in said step b);
d) calcining the solid formed in said step c).

16 Claims, No Drawings

PROCESS FOR PREPARING AN ALUMINA WITH CONTROLLED MESOPOROSITY

This application is a continuation application of PCT International Application PCT/FR2009/000682, filed Jun. 10, 2009.

FIELD OF THE INVENTION

The present invention relates to the field of aluminas with controlled mesoporosity. More precisely, it relates to a novel process for preparing an alumina with controlled mesoporosity with a view to using said alumina as a support for catalysts, which catalysts are used in the reactions in a variety of catalytic applications.

PRIOR ART

Porous aluminas are routinely used as a support for catalysts or adsorbants. Such porous aluminas are prepared by precipitation of aluminium salts or by hydrolysis of aluminium alkoxides. They have good thermal and chemical stability, but generally have a relatively broad pore size distribution and a relatively moderate specific surface area.

Aluminas with good thermal and chemical stability, with a calibrated mesopore size and with a high specific surface area are being actively developed for applications in catalysis or adsorption. Aluminas prepared by precipitation of aluminium salts or hydrolysis of aluminium precursors in the presence of cationic, anionic, neutral or non-ionic surfactants have, as a function of the preparation conditions, good thermal and chemical stability, a calibrated mesopore size and a high specific surface area. Patent application WO-2004/014799 describes the preparation of such an alumina by hydrothermal treatment of a mixture comprising aluminium alkoxide, in particular aluminium tri-sec butoxide, a cationic surfactant, in particular a quaternary ammonium with formula $CH_3(CH_2)_{n-1}N(CH_3)_3Br$ (n=12, 14, 16 or 18), an organic alcohol type solvent, in particular 1-butanol, 2-butanol, 1-propanol, or 2-propanol and water. The alumina obtained by the process disclosed in patent application WO-2004/014799 has good thermal stability, a mesopore size calibrated to a value that in particular depends on the size of the surfactant (or on n), and a high specific surface area. However, it has a relatively moderate mesopore volume which results in mediocre catalytic performances when it is present in a catalyst employed in various hydrocarbon conversion reactions.

AIM AND ADVANTAGE OF THE INVENTION

The present invention pertains to a novel process for preparing a mesoporous alumina, comprising the following steps:
a) mixing, in aqueous solution, at least one source of aluminium constituted by an aluminium alkoxide, at least one cationic surfactant and at least one organic solvent selected from methanol and ethanol;
b) hydrothermally treating the mixture formed in said step a);
c) drying the solid formed in said step b);
d) calcining the solid formed in said step c).

The mesoporous alumina prepared in accordance with the process of the invention is an alumina with controlled mesoporosity, which has good thermal and chemical stability as well as a high specific surface area. Surprisingly and advantageously, the preparation process of the invention results in the production of a mesoporous alumina with a high mesopore volume, i.e. 0.60 ml/g or more, preferably 0.8 ml/g or more. This therefore produces much better catalytic performances for a catalyst comprising said mesoporous alumina and used in a process for conversion of a hydrocarbon feed compared with the catalytic performances obtained using a catalyst comprising a mesoporous alumina prepared in accordance with a prior art process. In particular, a catalyst comprising said mesoporous alumina prepared in accordance with the process of the invention and used in a hydrocarbon hydrodesulphurization process produces much better catalytic performances, especially in terms of conversion and selectivity, compared with those obtained using a catalyst comprising a mesoporous alumina prepared using a prior art process. Surprisingly, a catalyst comprising said mesoporous alumina prepared in accordance with the process of the invention is more active and more selective, especially when it is employed in a hydrocarbon hydrodesulphurization process, than a catalyst comprising a mesoporous alumina prepared using a prior art process. Further, another advantage of the process for preparing a mesoporous alumina of the invention is that it is simple and economic.

DESCRIPTION OF THE INVENTION

The subject matter of the present invention pertains to a process for preparing a mesoporous alumina, comprising the following steps:
a) mixing, in aqueous solution, at least one source of aluminium constituted by an aluminium alkoxide, at least one cationic surfactant and at least one organic solvent selected from methanol and ethanol;
b) hydrothermally treating the mixture formed in said step a);
c) drying the solid formed in said step b);
d) calcining the solid formed in said step c).

The process of the invention results in a mesoporous alumina with good thermal and chemical stability, with a uniform, controlled mesopore diameter, a high specific surface area and a high mesopore volume. The mesoporous alumina prepared in accordance with the process of the invention is free of micropores and macropores. The mesoporous alumina prepared in accordance with the process of the invention has a fibrillated, nodular or vermicular structure with mesopores having a regular diameter. Preferably, the alumina with controlled mesoporosity obtained in accordance with the process of the invention is in a fibrillated form. It has a specific surface area of more than 300 $m^2/g$, preferably more than 400 $m^2/g$, and a mesopore volume of 0.6 ml/g or more, preferably 0.8 ml/g or more.

Step a) of the process of the invention is advantageously carried out by initially mixing at least said cationic surfactant and at least said source of aluminium in said organic solvent selected from methanol and ethanol, then slowly adding water to said mixture. Said step a) is advantageously carried out at ambient temperature.

In accordance with step a) of the process of the invention, the molar composition of the mixture is such that the water/aluminium source molar ratio is in the range 0.1 to 10 and preferably in the range 1 to 3, and the cationic surfactant/aluminium source molar ratio is in the range 0.1 to 10, preferably in the range 0.1 to 2, and the organic solvent/water molar ratio is in the range 1 to 10, preferably in the range 4 to 6.

The cationic surfactant employed to carry out step a) of the process of the invention is preferably a quaternary ammonium type cationic compound with formula $CH_3(CH_2)_nN(CH_3)_3,X$, wherein n is in the range 8 to 22, and preferably n is in the range 12 to 16, and X is a halide, an acetate, a phosphate, a nitrate, a methylsulphate or a hydroxide, preferably a halide and highly preferably a bromide. The size of the surfactant or the length of the —(CH$_2$)— chain can be used to adjust the diameter of the mesopores of the alumina. The chosen cationic surfactant is preferably cetyltrimethylammonium bromide (CTAB, n=15). The surfactant molecules combine together under the synthesis conditions and form an organized micellar aggregation in the synthesis medium. The quantity of surfactant must be neither too low, so that this micellar aggregation role can be carried out, nor must it be too high, so that the cost of the process is reasonable.

The source of aluminium employed for carrying out step a) of the preparation process of the invention is an aluminium alkoxide with formula Al(OR)$_3$, R being a linear or branched alkyl group, preferably branched. Highly preferably, said source of aluminium is aluminium tri-sec butoxide (Al(OCH(CH$_3$)(C$_2$H$_5$))$_3$) or aluminium isopropoxide (Al(OCH(CH$_3$)$_2$)$_3$).

The water employed to carry out said step a) of the preparation process of the invention ensures hydrolysis of the aluminium alkoxide at a limited rate compared with that at which aggregation of the surfactant micelles occurs. The quantity of water must be neither too small, so that hydrolysis of the aluminium alkoxide can occur, nor too high, so that too rapid a hydrolysis reaction compared with micellar aggregation is avoided.

The organic solvent selected from methanol and ethanol used to carry out said step a) of the process of the invention can in particular be used to dilute the water and slow down the aluminium alkoxide hydrolysis. Highly preferably, said organic solvent is ethanol.

The mixture formed during said step a) of the preparation process of the invention advantageously comprises an aluminium complexing agent in order to slow down the rate of aluminium alkoxide hydrolysis. As an example, it is butane-1,3-diol or triethanolamine. The proportion of complexing agent is such that the complexing agent/aluminium source molar ratio is in the range 0 to 10, preferably in the range 0 to 2, highly preferably in the range 0.1 to 2. Advantageously, said complexing agent is introduced simultaneously with the surfactant and the aluminium source.

In accordance with step b) of the preparation process of the invention, the hydrothermal treatment is carried out at a temperature that is preferably in the range 25° C. to 200° C., highly preferably in the range 80° C. to 150° C. It is carried out for a period that is preferably in the range 5 hours to 100 hours, highly preferably in the range 10 hours to 50 hours.

At the end of said hydrothermal treatment, the solid is recovered using the usual separation techniques (filtration or centrifuging) and washed with copious quantities of solvent, preferably the organic solvent used when carrying out said step a), in order to extract excess dissolved species from the solid, in particular the cationic surfactant.

In step c) of the preparation process of the invention, drying is carried out at a temperature that is preferably in the range 25° C. to 150° C. and highly preferably in the range 50° C. to 120° C. It is carried out in ambient air. The intention is to evaporate the majority of the alcoholic organic solvent used when carrying out said step a) of the process of the invention.

In accordance with step d) of the preparation process of the invention, calcining is carried out at a temperature which is preferably in the range 400° C. to 800° C. and highly preferably in the range 500° C. to 750° C. It is carried out for a period that is preferably in the range 2 to 12 h, highly preferably in the range 4 to 10 h, in ambient air. The intention is to extract the surfactant by thermal decomposition, and thus to liberate the mesoporosity of said mesoporous alumina.

The mesoporous alumina obtained in accordance with the process of the invention is an alumina with controlled mesoporosity. It is characterized by several analytical techniques. Said mesoporous alumina is characterized by the small angle X ray diffraction technique (values for the angle 2 theta in the range 0.5° to 6°, CuK$_\alpha$ radiation) and the wide angle X ray diffraction technique (values for the angle 2 theta in the range 5° to 100°, CuK$_\alpha$ radiation). The small angle X ray diffractogram of said alumina has a diffusion peak at 2 theta in the range 1° to 3° (CuK$_\alpha$ radiation), which reveals that the alumina obtained is a structure formed by mesopores with no perfect long distance order and that it has a uniform mesopore diameter. The wide angle X ray diffractogram of said mesoporous alumina reveals that it is a low crystallinity gamma alumina. Said mesoporous alumina obtained in accordance with the process of the invention is also analyzed by transmission electron microscopy (TEM), which can be used to form an image of the solid being studied, the contrasts observed being characteristic of the structural organization, the texture or the morphology of the observed solid. The TEM images obtained for the mesoporous alumina prepared in accordance with the process of the invention have a fibrillated, nodular or vermicular structure with mesopores with a regular diameter. Preferably, the alumina with controlled mesoporosity obtained in accordance with the process of the invention is in the fibrillated form. Said alumina with controlled mesoporosity is also analyzed by nitrogen physisorption after vacuum degassing and is identified by a type IV isotherm and a type H2 hysteresis using the IUPAC classification (K S W Sing, D H Everett, R A W Haul, L Moscou, R A Pierotti, L Rouquerol, T Siemieniewska, IUPAC, Pure and Appl Chem 57 (1985), 603), which are characteristic of mesoporous solids, with a step on the desorption isotherm which is characteristic of mesopores with a regular diameter. The alumina with controlled mesoporosity obtained in accordance with the process of the invention has a specific surface area S$_{BET}$ deduced using the BET theory (S Brunauer, P H Emmett, E Teller, J Am Chem Soc 60 (1938), 309) of more than 300 m$^2$/g, preferably more than 400 m$^2$/g. It has a size (diameter) distribution of mesopores, deduced from the BJH theory (E P Barett, L G Joyner, P P Hallender, J Am Chem Soc 73 (1951), 373), applied to the desorption branch, centred (D$_{BJH}$) in the range 4 to 20 nm, preferably in the range 5 to 15 nm. The width of the mesoporous distribution is narrow and corresponds to a min value (Dmin) for the size or diameter of the mesopores of more than 0.25×D$_{BJH}$, and a maximum value (Dmax) for the size or diameter of the mesopores of less than 1.75×D$_{BJH}$. Said alumina with controlled mesoporosity obtained in accordance with the process of the invention has a mesopore volume, measured from the saturated vapour pressure isotherm (V$_{N2}$, determined as the volume of liquid condensed in the pores of the material being analyzed, at a pressure close to saturation pressure (Gurvitsch law): L Gurvitsch, J Phys Chem Soc Russ, 47 (1915), 805) which is very high, preferably 0.6 ml/g or more, and more preferably 0.8 ml/g or more. Preferably, said mesopore volume is less than 4 ml/g. In accordance with the invention, the mesoporous alumina prepared using the process of the present invention is free of micropores and macropores.

The alumina with controlled mesoporosity obtained using the preparation process of the invention is advantageously used as a catalyst support. The preparation of a catalyst comprising said alumina with controlled mesoporosity as a catalytic support is carried out using catalyst preparation methods that are known to the skilled person. Such a catalyst generally comprises an active metallic phase deposited in the pores of a support formed from said mesoporous alumina. The support is obtained by forming said mesoporous alumina using methods that are known to the skilled person. Said mesoporous alumina may be formed by adding a mineral binder to provide the matrix formed with cohesion following drying and calcining. Said mesoporous alumina may also be formed before calcining it with or without adding a mineral binder. The mesoporous alumina prepared in accordance with the process of the invention is advantageously formed by mixing-extrusion, i.e. mixed with boehmite and an aqueous acidic solution to encourage peptization of the boehmite and to form a paste, which is pushed through a die to form extrudates, with a diameter that is generally from 0.4 to 4 mm after drying and calcining. The formed alumina is then dried to evaporate the majority of the solvent (water) introduced during forming, and calcined to provide cohesion of the matrix formed and if necessary to extract the surfactant by thermal decomposition, if it is still present.

The active phase may be introduced into the pores of the alumina prepared in accordance with the process of the invention before forming, or during forming, or into the pores of the support after forming. Introduction into the pores is carried out using impregnation techniques that are known to the skilled person. The catalyst may, for example, contain metals from group VIB and/or VIII of the periodic table of the elements, with a hydrodehydrogenating nature. It may, for example, be molybdenum and/or tungsten for the elements from group VIB, or cobalt and/or nickel for the elements from group VIII. Preferably, the metal from group VIB is introduced at the same time or just after the metal from group VIII, regardless of the mode of introduction. The metals are preferably introduced by dry impregnation of the alumina prepared in accordance with the process of the invention, before or after forming, using solutions containing precursor salts of the metals. It may be carried out by one or more operations for impregnating the alumina prepared in accordance with the process of the invention, before or after forming, using one or more solutions containing the metallic precursor or metallic precursors. The alumina prepared in accordance with the process of the invention thus containing the metals is dried to evaporate the solvent (water), and calcined to convert the metallic precursors into metallic oxides. In the case in which the elements are introduced in several steps for impregnation of the corresponding precursor salts, intermediate drying and calcining steps are generally carried out. Before use, it is often necessary to transform the metallic oxides into sulphide in order to form the active species. This activation phase is carried out in a reducing feed in the presence of hydrogen and hydrogen sulphide.

The catalyst obtained thereby and comprising said alumina with controlled mesoporosity obtained using the preparation process of the invention is advantageously used for hydrorefining and/or hydroconversion of hydrocarbon feeds such as oil cuts, the cuts from coal or hydrocarbons produced from natural gas, and is more particularly used for hydrogenation, hydrodenitrogenation, hydrodeoxygenation, hydrodearomatization, hydrodesulphurization, hydrodemetallization, hydroisomerization, hydrodealkylation and dehydrogenation of hydrocarbon feeds such as feeds containing, for example, aromatic and/or olefinic compounds and/or naphthenes, and/or paraffins, said feeds possibly containing metals and/or nitrogen and/or oxygen and/or sulphur. Highly preferably, said catalyst comprising said alumina with controlled mesoporosity obtained using the preparation process of the invention is used for hydrodesulphurization and hydrodenitrogenation of hydrocarbon feeds. In the case in which a high hydrodesulphurization activity is desired, the metals of the hydrodehydrogenating function present in the catalyst comprising alumina prepared in accordance with the process of the invention consist of a combination of cobalt and molybdenum. If a high hydrodenitrogenation activity is desired, a combination of nickel and molybdenum or tungsten is preferred.

The feeds employed in the various processes using the catalyst comprising said alumina with controlled mesoporosity obtained using the preparation process of the invention are generally selected from the group formed by gasolines, gas oils, vacuum gas oils, deasphalted or non-deasphalted residues, paraffin oils, waxes and paraffins. They contain at least one heteroatom such as sulphur, oxygen, nitrogen and possibly metals such as nickel and vanadium. The hydrorefining or hydroconversion conditions, such as temperature, pressure, the volume ratio of liters of hydrogen/liters of hydrocarbon, or the hourly space velocity, may vary widely as a function of the nature of the feed, the quality of the desired products and the facilities available to the refiner. The operating conditions used in the reactor or reactors for the various processes using the catalyst comprising said alumina with controlled mesoporosity obtained using the preparation process of the invention are: a temperature of more than 200° C., preferably in the range 200° C. to 450° C., a pressure in the range 0.5 to 30 MPa, preferably less than 20 MPa, with the space velocity being in the range $0.1\ h^1$ to $10\ h^{-1}$, preferably in the range $0.1\ h^{-1}$ to $8\ h^1$, and highly preferably in the range $0.2\ h^{-1}$ to $6\ h^1$, and the quantity of hydrogen introduced is such that the volume ratio of the liters of hydrogen/liters of hydrocarbon HC is in the range 10 to 5000 l/l, preferably in the range 100 to 2000 l/l.

The following examples illustrate the invention without limiting its scope. The aluminas in the examples below were analyzed by the analytical techniques described above in the present description.

Example 1 (Comparative)

Preparation of an Alumina A1 in Accordance with WO-2004/014799

This example describes the preparation of an alumina A1 with controlled mesoporosity in accordance with the protocol described in Example 1-4 of patent application WO-2004/014799 and the publication by H C Lee et al (Microporous and Mesoporous Materials 79 (2005), 61-68) using aluminium tri-sec butoxide (Al-sec-but) as the source of aluminium, cetyltrimethylammonium bromide (CTAB) as the cationic surfactant and 1-butanol (ButOH) as the organic solvent.

The mixture had the following molar composition: 1 Al-sec-but: 0.5 CTAB: $2H_2O$: 10 ButOH.

35.69 g of cetyltrimethylammonium bromide (CTAB) was dissolved in 72.65 g of 1-butanol. 48.32 g of aluminium tri-sec butoxide (Al-sec-but) was also dissolved in 72.5 g of 1-butanol. The CTAB solution was added slowly to the Al-sec-but solution with continuous stirring. After 0.5 h, 7.06 g of water was slowly added to the mixture. The mixture was introduced into a stainless steel autoclave with a Teflon liner and underwent hydrothermal treatment at 100° C. for 24 h. The solid, recovered by filtration, was washed with copious quantities of ethanol and dried at ambient temperature for 16 h then in a ventilated oven at 110° C. for 5 h in ambient air. It was then calcined in a muffle furnace at 500° C. for 4 h in ambient air with a temperature ramp-up of 2° C./min. Alumina A1 was thus obtained.

Alumina A1 was characterized by wide angle XRD, small angle XRD, nitrogen volumetric analysis and TEM.

The wide angle XRD produced a diffractogram which revealed that the alumina A1 obtained was a low crystallinity gamma alumina. The small angle XRD produced an image of a peak characteristic of a structure formed by mesopores with no perfect long distance order and with a uniform mesopore diameter. TEM analysis revealed that the alumina A1 had a vermicular structure with regular diameter mesopores. Nitrogen volumetric analysis (nitrogen physisorption) produced a specific surface area for alumina A1 of 340 m$^2$/g with a narrow mesopore size (diameter) distribution in the range 1.0 nm to 7 nm, centred on 4.0 nm and with a mesopore volume of 0.45 ml/g. All of this structural data is summarized in Table 1.

Example 2 (Invention)

Preparation of an Alumina A2 with Controlled Mesoporosity

This example describes the preparation of an alumina A2 with controlled mesoporosity in accordance with the invention using aluminium tri-sec butoxide (Al-sec-but) as the source of aluminium, cetyltrimethylammonium bromide as the cationic surfactant and ethanol (EtOH) as the organic solvent.

The mixture had the following molar composition: 1 Al-sec-but: 0.5 CTAB: 2H$_2$O: 10 EtOH.

35.69 g of cetyltrimethylammonium bromide (CTAB) was dissolved in 45.13 g of ethanol. 48.32 g of aluminium tri-sec butoxide (Al-sec-but) was also dissolved in 45.10 g of ethanol. The CTAB solution was added slowly to the Al-sec-but solution with continuous stirring. After 0.5 h, 7.06 g of water was slowly added to the mixture. The mixture was introduced into a stainless steel autoclave with a Teflon liner and underwent hydrothermal treatment at 100° C. for 24 h. The solid, recovered by filtration, was washed with copious quantities of ethanol and dried at ambient temperature for 16 h then in a ventilated oven at 110° C. for 5 h in ambient air. It was then calcined in a muffle furnace at 500° C. for 4 h in ambient air with a temperature ramp-up of 2° C./min. Alumina A2 was thus obtained.

Alumina A2 was characterized by wide angle XRD, small angle XRD, nitrogen volumetric analysis and TEM.

The wide angle XRD produced a diffractogram which revealed that the alumina A2 obtained was a low crystallinity gamma alumina. The small angle XRD produced an image of a peak characteristic of a structure formed by mesopores with no perfect long distance order and with a uniform mesopore diameter. TEM analysis revealed that alumina A2 had a fibrillated structure. Nitrogen volumetric analysis (nitrogen physisorption) produced a specific surface area for alumina A2 of 423 m$^2$/g with a narrow mesopore size (diameter) distribution in the range 3.0 nm to 9.0 nm, centred on 6.2 nm, and with a mesopore volume of 0.85 ml/g. All of this structural data is summarized in Table 1.

Example 3 (Invention)

Preparation of an Alumina A3 with Controlled Mesoporosity

An alumina A3 with controlled mesoporosity was prepared under the operating conditions used in preparing alumina A2, with the exception that the calcining temperature in this example was 750° C. Alumina A3 was thus obtained.

The alumina A3 was characterized by wide angle XRD, small angle XRD, nitrogen volumetric analysis and TEM.

The wide angle XRD produced a diffractogram which revealed that the alumina A3 obtained was a low crystallinity gamma alumina. The small angle XRD produced an image of a peak characteristic of a structure formed by mesopores with no perfect long distance order and with a uniform mesopore diameter. TEM analysis revealed that alumina A3 had a fibrillated structure. Nitrogen volumetric analysis (nitrogen physisorption) produced a specific surface area for alumina A3 of 309 m$^2$/g with a narrow mesopore size (diameter) distribution in the range 3.5 nm to 8.9 nm, centred on 6.7 nm and with a mesopore volume of 0.69 ml/g. All of this structural data is summarized in Table 1.

TABLE 1

Textural properties of aluminas A1, A2, A3 and A4

| | $S_{BET}$ (m$^2$/g) | $V_{N2}$ (ml/g) | $D_{BJH}$ (nm) | $D_{min}$ (nm) | $D_{max}$ (nm) |
|---|---|---|---|---|---|
| Alumina A1 | 340 | 0.45 | 4.0 | 1.0 | 7.0 |
| Alumina A2 | 423 | 0.85 | 6.2 | 3.0 | 9.0 |
| Alumina A3 | 309 | 0.69 | 6.7 | 3.5 | 8.9 |
| Alumina A4 | 250 | 0.68 | 10.4 | 3.0 | 25 |

Aluminas A2 and A3, prepared in accordance with the process of the invention, had a narrow mesopore size (diameter) distribution as well as a high specific surface area. They have a significantly higher mesopore volume than that of the alumina A1 prepared in accordance with the prior art process. Alumina A3, which was characterized by a high specific surface area and high mesopore volume although it had been calcined at a high temperature, exhibited very good thermal stability.

Example 4

Preparation of Catalysts C1, C2, C3 and C4

Catalysts C1, C2, C3 and C4 were prepared respectively from aluminas A1, A2, A3 and A4, alumina A4 being a commercially available gamma alumina with reference Versal 250 from La Roche, which had been formed by mixing-extrusion, dried at 140° C. for 2 h in ambient air, calcined at 600° C. for 2 h in ambient air and ground, and having the textural properties given in Table 1.

Catalysts C1, C2, C3 and C4 were prepared by simultaneous dry impregnation of cobalt nitrate (Co(NO$_3$)$_3$)$_9$H$_2$O, Fluka) and ammonium heptamolybdate ((NH$_4$)$_6$Mo$_7$O$_{24}$, 4 H$_2$O, Fluka). The formulation was adjusted in order to deposit 10% by weight of molybdenum and 2.45% by weight of cobalt onto each of the aluminas A1, A2, A3 and A4. Impregnation was followed by maturation for 2 h at ambient temperature, drying in a ventilated oven in ambient air at 110° C. for a period of 16 h and calcining in a muffle furnace at 500° C. for 8 h in ambient air with a temperature ramp-up of 1.5° C./min.

Each catalyst was characterized by nitrogen volumetric analysis. The results of the analyses by nitrogen volumetric analysis carried out on catalysts C1, C2, C3 and C4 are shown in Table 2.

TABLE 2

Textural properties of catalysts C1, C2, C3 and C4

| | $S_{BET}$ (m$^2$/g) | $V_{N2}$ (ml/g) | $D_{BJH}$ (nm) | $D_{min}$ (nm) | $D_{max}$ (nm) |
|---|---|---|---|---|---|
| C1 | 261 | 0.32 | 4.5 | 1.5 | 7.5 |
| C2 | 324 | 0.60 | 7.0 | 3.8 | 9.8 |
| C3 | 241 | 0.56 | 7.4 | 4.0 | 9.9 |
| C4 | 196 | 0.55 | 11.5 | 4.0 | 26.0 |

Catalysts C2 and C3 respectively comprising alumina A2 and alumina A3 with controlled mesoporosities and prepared in accordance with the process of the invention had a narrow size (diameter) distribution of mesopores, a high specific surface area and above all a very high mesopore volume despite the deposit of active phase, compared with catalyst C1 comprising alumina A1 prepared in accordance with the prior art. Catalysts C2 and C3 also had a narrow mesopore size (diameter) distribution and a high specific surface area compared with those of catalyst C4 produced with the conventional alumina A4. Aluminas A2 and A3 prepared in accordance with the process of the invention thus had good properties as regards being a catalyst support, and also had very good chemical stability.

Example 5

Catalytic Evaluations of Catalysts C1, C2, C3 and C4 in Thiophene Hydrodesulphurization (Model Sulphur-Containing Molecule)

Thiophene hydrodesulphurization was selected as the reference catalytic test to evaluate the performances of catalysts C1, C2, C3 and C4 in hydrocarbon hydrodesulphurization. Thiophene is a simple model molecule representative of the aromatic sulphur-containing molecules present in hydrocarbons. The catalytic performances of catalysts C1, C2, C3 and C4 were evaluated in terms of thiophene conversion and selectivity for butane, which is the desired product in the hydrodesulphurization reaction. Since it was a model molecule test, the operating conditions were adapted compared with those employed in an industrial unit.

Catalysts C1, C2, C3 and C4 underwent sulphurization carried out at atmospheric pressure at 400° C. for 2 h (temperature ramp-up 6° C./min) in H$_2$S (10% by volume) in a stream of hydrogen (60 ml/min). Sulphurization was carried out in situ before carrying out the catalytic test in a fixed bed reactor loaded with 0.2 g of catalyst, at atmospheric pressure. The thiophene, purified by vacuum distillation two times in succession, was introduced into the reactor at a constant pressure of 6.65 kPa in a stream of hydrogen (10 ml/min). This catalytic test was carried out at a temperature of 350° C. and a pressure of 0.1 MPa.

The quantity of reagent (thiophene) and products (butane, but-1-ene, trans but-2-ene, cis but-2-ene) was analyzed using a gas chromatograph equipped with a flame ionization detector and a PLOT alumina column.

The catalytic performances of catalysts C1, C2, C3 and C4 were evaluated by determining the thiophene conversion and the butane selectivity. The results are shown in Table 3.

The thiophene conversion was calculated as follows: $Cv_{thio} = (\Sigma a_i/4)/(a_{thio}/3.4 + \Sigma a_i/4)$, wherein $a_i$ is the area on the chromatogram of the peak corresponding to product i, namely butane, but-1-ene, trans but-2-ene and cis but-2-ene, and $a_{thio}$ is the area of the peak corresponding to thiophene on the chromatogram.

The selectivity for butane was calculated as follows: $Sel_{butane} = a_{butane}/\Sigma a_i/4$, where $a_i$ is as defined above for the conversion computation and $a_{butane}$ is the area of the peak on the chromatogram corresponding to butane.

TABLE 3

Conversion and selectivity of catalysts C1, C2, C3 and C4

| Catalyst | Conversion (%) | Selectivity (%) |
|---|---|---|
| C1 | 17 | 15 |
| C2 | 32 | 20 |
| C3 | 30 | 18 |
| C4 | 29 | 17 |

The results demonstrate that catalysts C2 and C3 respectively comprising alumina A2 and A3 prepared in accordance with the process of the invention produce the best catalytic performances in terms of thiophene conversion and selectivity for butane than those observed using catalyst C1 comprising a mesoporous alumina prepared in accordance with the prior art. Catalysts C2 and C3 also produce a thiophene conversion and selectivity for butane which are higher than those obtained with catalyst C4 comprising a conventional commercially available alumina. Catalysts C2 and C3 are thus more active and more selective catalysts than catalysts C1 and C4.

The invention claimed is:

1. A process for preparing a mesoporous alumina, comprising:
   a) mixing, in aqueous solution, at least one source of aluminium comprising an aluminium alkoxide, at least one cationic surfactant and at least one organic solvent that is methanol or ethanol;
   b) hydrothermally treating a mixture formed in said a);
   c) drying a solid formed in said b);
   d) calcining a solid formed in said c).

2. A preparation process according to claim 1, wherein the molar composition of the mixture in a) is such that the water/aluminium source molar ratio is in the range of 0.1 to 10, the cationic surfactant/aluminium source molar ratio is in the range of 0.1 to 10 and the organic solvent/water molar ratio is in the range of 1 to 10.

3. A preparation process according to claim 1, wherein said cationic surfactant employed in a) is a cationic quaternary ammonium compound with formula $CH_3(CH_2)_nN(CH_3)_3,X$, wherein n is in the range 8 to 22 and X is a halide, an acetate, a phosphate, a nitrate, a methylsulphate or a hydroxide.

4. A preparation process according to claim 3, wherein said cationic surfactant is cetyltrimethylammonium bromide.

5. A preparation process according to claim 1, wherein said source of aluminium is aluminium tri-sec butoxide or aluminium isopropoxide.

6. A preparation process according to claim 1, wherein said organic solvent is ethanol.

7. A preparation process according to claim 1, wherein said hydrothermal treatment is carried out at a temperature in the range of 25° C. to 200° C. for a period in the range of 5 to 100 hours.

8. A preparation process according to claim 1, wherein drying is carried out at a temperature in the range of 25° C. to 150° C.

9. A preparation process according to claim 1, wherein the calcining is carried out at a temperature in the range of 400° C. to 800° C.

10. A preparation process according to claim 1, wherein said mesoporous alumina is in the form of fibrils.

11. A preparation process according to claim 1, wherein said mesoporous alumina has a specific surface area of more than 300 m²/g.

12. A preparation process according to claim 1, wherein said mesoporous alumina has a mesopore volume of 0.6 ml/g or more.

13. A preparation process according to claim 1, wherein said mesoporous alumina is free of micropores and macropores.

14. A preparation process according to claim 1, wherein the molar composition of the mixture in a) is such that the water/aluminium source molar ratio is in the range of 1 to 3, the cationic surfactant/aluminium source molar ratio is in the range of 0.1 to 2 and the organic solvent/water molar ratio is in the range of 4 to 6.

15. A preparation process according to claim 14, wherein said cationic surfactant is cetyltrimethylammonium bromide.

16. A preparation process according to claim 15, wherein said source of aluminium is aluminium tri-sec butoxide or aluminium isopropoxide.

\* \* \* \* \*